United States Patent [19]

Bunn, Jr. et al.

[11] 4,002,552

[45] Jan. 11, 1977

[54] LIQUID LEVEL CONTROL SYSTEM

[75] Inventors: Julian W. Bunn, Jr., Raleigh, N.C.;
Charles O. Buckley, Lewisburg, W. Va.

[73] Assignee: Trienco, Inc., Raleigh, N.C.

[22] Filed: Sept. 19, 1975

[21] Appl. No.: 614,755

[52] U.S. Cl. .............................. 204/266; 204/129; 204/230
[51] Int. Cl.² .................... C25B 1/02; C25B 15/02; C25B 1/12
[58] Field of Search .......................... 204/229–231, 204/129, 266

[56] References Cited

UNITED STATES PATENTS

| | | | |
|---|---|---|---|
| 3,330,755 | 7/1967 | Mahany | 204/230 |
| 3,616,436 | 10/1971 | Haas | 204/229 |
| 3,761,382 | 9/1973 | Hammond et al. | 204/266 |

*Primary Examiner*—T. M. Tufariello
*Attorney, Agent, or Firm*—B. B. Olive

[57] ABSTRACT

A control system is provided to control the liquid level in the pressure vessel of a hydrogen generator by means of three electrical probes which extend into the vessel and are electrically connected through an amplifier and switching circuit to a liquid supply pump, a solenoid valve on the hydrogen removal line and a generator power supply.

9 Claims, 3 Drawing Figures

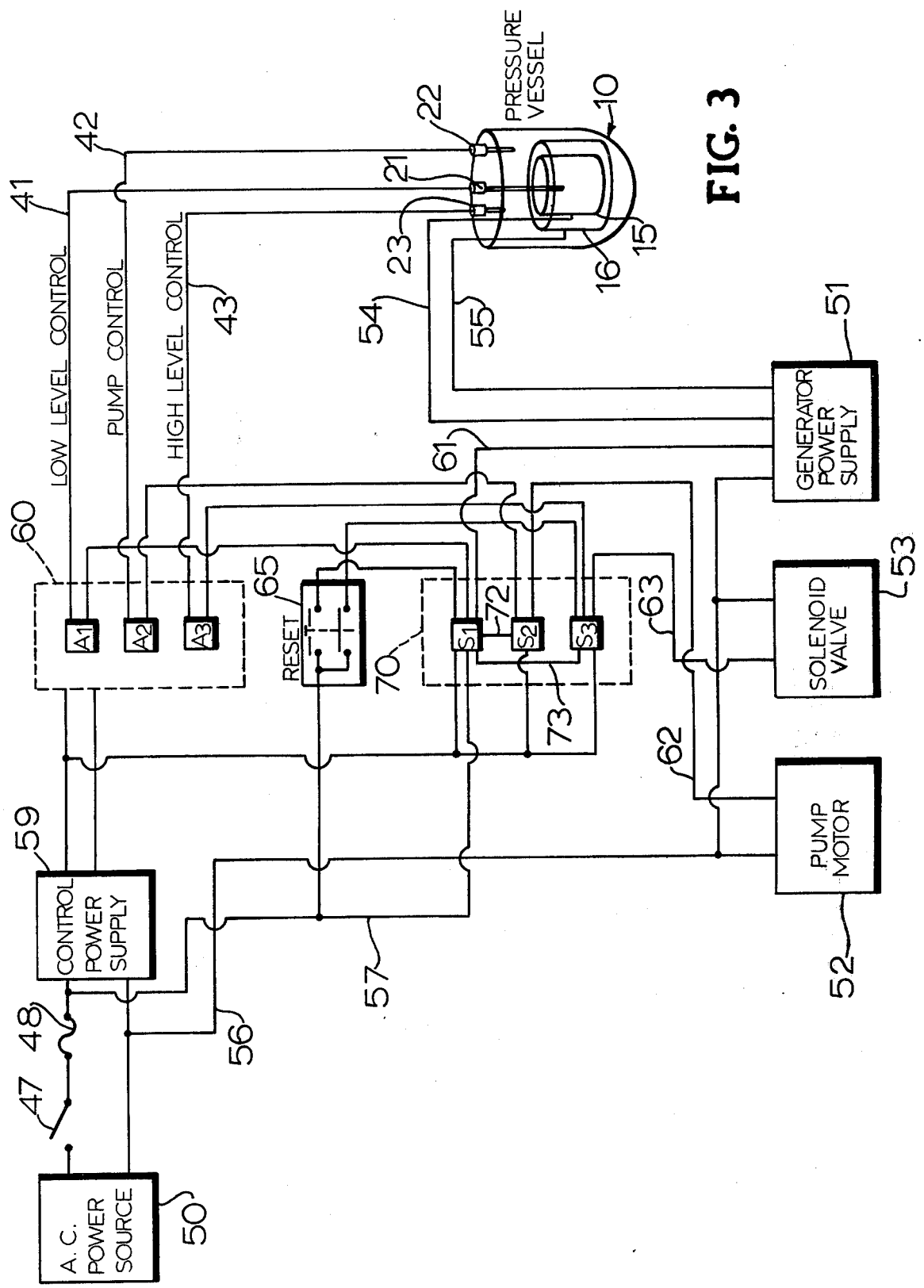

LIQUID LEVEL CONTROL SYSTEM

CROSS-REFERENCE TO COPENDING APPLICATION

This application is related to copending application Ser. No. 593,751, filed July 7, 1975, entitled "Pressure Vessel For Hydrogen Generator," that teaches a specific pressure vessel assembly into which the present invention is incorporated in the preferred embodiment.

BACKGROUND OF THE INVENTION

1. Field of the Invention

The invention relates to systems for controlling the level of a liquid in a vessel. More specifically, the invention relates to a system for controlling the level of the electrolytic solution in the pressure vessel of a hydrogen generator.

2. Description of the Prior Art

Liquid level control systems of the prior art have typically been characterized by conventional float and switch arrangements. Such arrangements are generally bulky and cumbersome and are not well adapted for use in relatively small, pressurized liquid containers such as the pressure vessel of a hydrogen generator.

The disadvantages of float and switch control systems have been recognized in the art. In U.S. Pat. No. 3,761,382, the pressure vessel of a hydrogen generator is provided with a single electrode probe which is adapted to detect the level of the electrolytic solution so that when such level drops below a predetermined point, a water pump is activated to replenish the liquid. This patented system is provided with a capacitive time delay which removes power from selected portions of the generator after a prolonged, unsatisfied demand for water.

The single probe technique of U.S. Pat. No. 3,761,382, although an improvement over previous practice, has proven to have several drawbacks in practice. First, the time delay shut-off system can shut down the system only after a prolonged period of low liquid level. In the time required for the time delay system to activate, the electrolyte level can drop below the partition separating the hydrogen and oxygen collection spaces and result in a mixing of these gases with a possible explosion. Furthermore, when the electrolyte level is below the top of the electrodes, the efficiency of the generator is reduced due to inadequate electrode exposure to the electrolyte and due to an increased concentration of caustic in the electrolytic solution. Thus, there is a need for a control system which will immediately shut down the entire generator unit when the electrolyte level drops below a predetermined danger level. A second drawback of the patented generator is that there is no reliable control means to prevent the liquid level from rising within the hydrogen collection space to a point where the liquid can be drawn into the hydrogen removal line. When the electrolytic solution is drawn into this line, there is extremely costly contamination of the line and the attached hydrogen purifier or other attached instruments. Thus, there is a need for means to prevent the electrolytic solution from entering the hydrogen removal line. A third drawback of the patented generator is that a single probe is not suitable for controlling the separate levels maintained within the hydrogen and oxygen collection spaces. There is a need for a multiple probe technique which will adequately maintain both liquid levels within a specified range.

Thus, it is a primary object of this invention to improve on the liquid level control system of U.S. Pat. No. 3,761,382 while maintaining the many advantages of such a system.

SUMMARY OF THE INVENTION

The control system of the invention is designed to control the liquid levels in the hydrogen and oxygen collection spaces of a hydrogen generator pressure vessel. The system includes a constant level control which is connected to the liquid supply pump motor and is designed to hold a nearly constant liquid level in the oxygen collection space. The system further includes a high level control which actuates an electric circuit should the liquid level in the hydrogen collection space rise above a predetermined level. A third control is adapted to shut down the entire unit when a malfunction causes the liquid level in the oxygen collection space to drop below a predetermined level.

The controls are activated by three electrical probes which extend into the pressure vessel to sense the level of the liquid. The probes are connected through an amplifier and switching circuit to the liquid supply pump motor, a solenoid valve on the hydrogen removal line and the generator power supply to control the energization of these three elements.

DESCRIPTION OF THE DRAWINGS

FIG. 3 is a schematic diagram of the electrical circuitry employed in the invention.

DESCRIPTION OF THE PREFERRED EMBODIMENT

Figure 1:
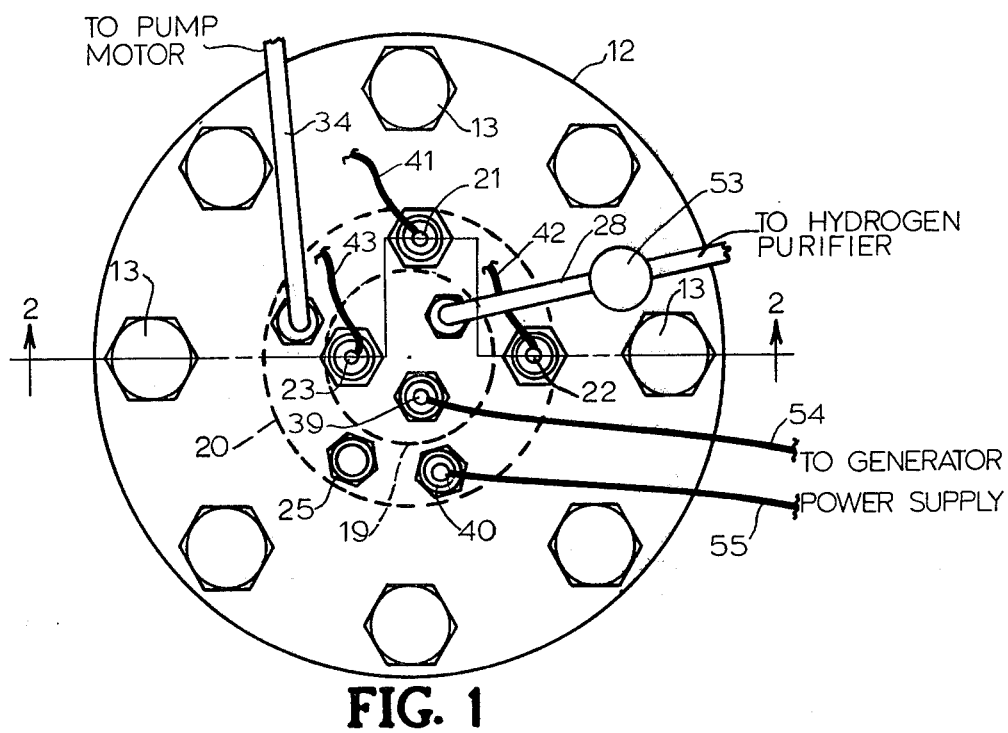
FIG. 1 is a top view of the pressure vessel of a hydrogen generator which utilizes the control system of the present invention and showing the electrical probes and associated generator elements.

The pressure vessel 10 of a hydrogen generator of the type generally described in U.S. Pat. No. 3,761,382 and more specifically described in copending application Ser. No. 593,751, which is incorporated herein by reference, comprises a tank member 11 and top member 12. In a specific embodiment, tank 11 consists of a standard 4 inch weld cap 11a which is welded to a standard 4 inch weld neck flange 11b, and top member 12 is a 4 inch blind flange. Members 11 and 12 are secured together in a gas tight seal by bolts 13 and nuts 14 to form a closed cylindrical vessel having a circumference 20. Tank 11 encloses four cylindrical components: hydrogen electrode screen 15, oxygen electrode screen 16, asbestos curtain 18, and slotted tube member 19, which are arranged in a closely-spaced concentric manner. Upon bringing the electrolytic solution 17 to a point above electrode screens 15, 16 and energizing electrode screens 15 and 16, the above-mentioned four cylindrical components cooperate to generate hydrogen and oxygen gas through electrolysis and collect such gases in hydrogen collection space 30 and oxygen collection space 31. The general method of such gas generation is set forth in U.S. Pat. No. 3,761,382 and is well known in the art.

Figure 2:
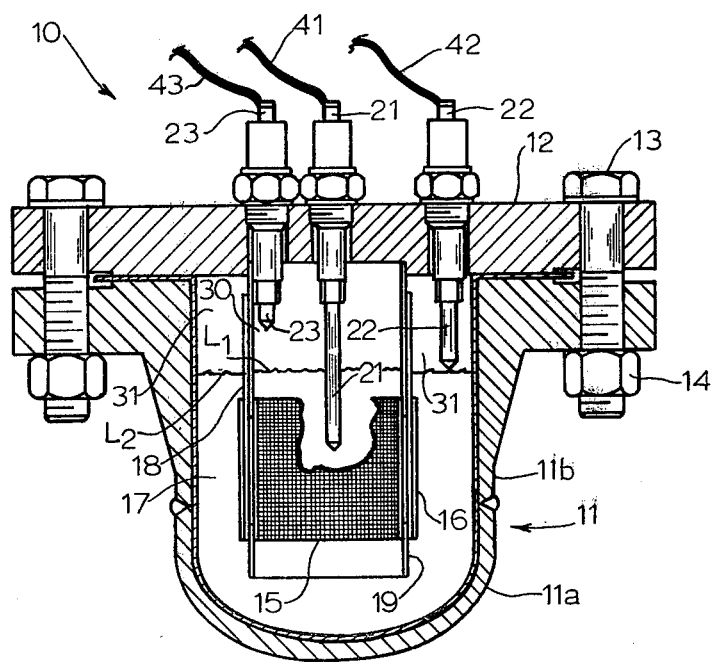
FIG. 2 is a side section view of the pressure vessel taken along line 2—2 of FIG. 1 and illustrating selected internal components of the vessel including the three probes of the invention which are not sectioned for purposes of illustration.

Slotted tube member 19 is secured in a gas-tight connection to the interior surface of top member 12 thereby isolating a hydrogen collection space 30 from an oxygen collection space 31 so that the gases in spaces 30, 31 cannot intermix as long as the liquid levels, $L_1$ and $L_2$, in these respectives spaces are maintained above the bottom of tube 19. Although $L_1$ and $L_2$ are shown at the same level in FIG. 2, indicating equal pressures in spaces 30 and 31, it is apparent that in actual operation levels $L_1$ and $L_2$ will generally be at different levels according to the pressures maintained in spaces 30 and 31. As hydrogen and oxygen gases are generated, the hydrogen gas is directed through a hydrogen removal tube 28 and solenoid valve 53 (FIG. 1) to a hydrogen purifier or other use, and the oxygen is bled to the atmosphere at a controlled rate through an oxygen release valve 25 (FIG. 1). The respective pressures in hydrogen collection space 30 and oxygen collection space 31 can be controlled by a pressure regulator (not shown) in line 28 and oxygen relief valve 25, and levels $L_1$ and $L_2$ vary accordingly. Three electrode probes, 21, 22, 23 are inserted through top member 12 and into pressure vessel 10 in order to sense variations in levels $L_1$ and $L_2$ and aid in the control of these levels within desired limits.

A low liquid level sensing probe 21 extends into oxygen collection space 31 to a point approximately halfway along the height of electrode screens 15 and 16. Probe 21 is adapted to derive a signal voltage from the hydrogen electrode screen 15 when the top of probe 21 extends below level $L_2$ of solution 17. When $L_2$ drops below the tip of probe 21 indicating one of several possible malfunctions in the generator, the signal voltage is removed from probe 21 and the entire generator unit is shut down by removing power from the generator power supply 51 (FIG. 3). A high liquid level sensing probe 23 extends a short distance into hydrogen collection space 30 and is adapted to close solenoid valve 53 when level $L_1$ rises to contact the tip of probe 23. $L_1$ rises to contact probe 23 when hydrogen is removed from collection space 30 too rapidly and there is a danger that solution 17 will be drawn into hydrogen removal line 28. By closing solenoid valve 53, the removal of hydrogen from collection space 30 is stopped so that, with the further generation of hydrogen, $L_1$ will drop to a point below the tip of probe 23. The third probe is pump control sensing probe 22 which extends downward into oxygen collection space 31 and is adapted to start the liquid supply pump motor 52 (FIG. 3) when $L_2$ moves below the tip of probe 22. Pump motor 52 pumps water into vessel 10 through a water line 34 until $L_2$ rises to contact the tip of probe 22.

A detailed description of the electrical circuitry involved in the control system will be described with reference to FIG. 3. An AC power source 50 supplies power through switch 47 and fuse 48 to a control power supply 59. Power supply 59 is a transformer-rectifier assembly which serves to supply continuous, low voltage DC power to an amplifier assembly 60 and a relay switch assembly 70. A conductor 56 connects one side of AC power 50 to generator power supply 51, pump motor 52, and solenoid valve 53. A conductor 57 connects the opposite side of AC power 50 to relay switching assembly 70 so that the circuits to generator power supply 51, pump motor 52, and solenoid valve 53 can be selectively opened and closed according to the position of levels $L_1$ and $L_2$ (FIG. 2) as sensed by probes 21, 22 and 23.

Amplifier assembly 60 includes three transistorized amplifiers A1, A2, A3, each of which receives its continuous base voltage from control power supply 59 and its signal or drive voltage from one of probes 21, 22, 23. Each amplifier A1 and A2, when driven by a signal voltage from its respective probe, serves to direct an impulse to its corresponding relay switch S1, S2 in relay switch assembly 70. Amplifier A3 operates in reverse from amplifiers A1 and A2 so that an impulse is directed to relay switch S3 only when the corresponding probe 23 is not in contact with solution 17.

Start up of the generator is accomplished by the operator closing switch 47 and momentarily depressing a reset button 65 (FIG. 3). Reset button 65 serves to bypass the switching circuitry and supply AC power directly to generator power supply 51 which in turn energizes electrode screens 15, 16 through conductors 54, 55. The momentary energization of electrode screens 15, 16 is sufficient to convey a signal voltage to amplifier A1 by means of probe 21. The signal voltage impressed on A1 results in relay switch S1 being energized so as to be locked into its closed position thereby connecting line 57 to generator power supply 51 through line 61. When relay switch S1 is so energized, AC power from line 57 is also supplied to the contacts of relay switches S2, S3 through lines 72, 73.

During normal operation, low liquid level probe 21 extends well below $L_2$. Due to a failure of pump motor 52, a leak in the system, or other cause, $L_2$ may drop to a point below the tip of probe 21. If this happens, power is removed from relay switch S1 causing it to drop out and cut off power to generator power supply 51 thereby shutting down the generator. In order to restart the generator after such a shutdown, the cause of the liquid loss must be found so that $L_2$ can be raised to a point where probe 21 is in the liquid. Then reset button 65 may be depressed to restart the generator in the manner previously described.

In normal operation, liquid level $L_2$ is above the tip of pump control probe 22 so that amplifier A2 supplies control power to relay switch S2. Relay switch S2, when energized by A2, produces an open circuit between AC power line 72 and pump motor 52. When $L_2$ drops below probe 22 indicating the need for more water in vessel 10, the control power is removed from relay switch S2, causing it to drop out and close the power circuit to pump motor 52 by means of line 62. Pump 52 will run until $L_2$ rises above the tip of probe 22 at which time relay switch S2 still lock in and cut off pump 52. It should be noted that pump motor 52 can be energized through relay switch S2 only when relay switch S1 is locked in so as to supply AC power to the contacts of S2 through line 72.

In normal operation, liquid level $L_1$ is below high liquid level control probe 23. Because amplifier A3 is reverse acting from A1 and A2 and selected to supply control power to relay switch S3 only when there is no contact between probe 23 and solution 17, S3 is energized in normal operation. During such normal operation, S3 serves to supply AC power to solenoid valve 53 through line 63 so that the valve is open to allow the removal of hydrogen from collection space 30 through line 28. When $L_1$ rises above normal to a point where it contacts the tip of probe 23 indicating that an excessive amount of hydrogen is being withdrawn from collection space 30 through line 28, a signal voltage from probe 23 causes relay switch S3 to drop out and thereby removes power from solenoid valve 53 so that the valve closes. With solenoid valve 53 closed, no hydrogen can be taken from the generator so $L_1$ immediately begins to drop with the continued accumulation of hydrogen in collection space 30. It can be seen that a malfunction in the generator could cause $L_1$ to vascillate so that solenoid valve 53 would be continuously opening and closing with the rise and fall of $L_1$. To prevent this, reset button 65 is provided as the only means to lock relay switch S3 in the closed position after it has dropped out due to the impulse from probe 23. In an alternative embodiment, this circuit could provide an automatic reset so that as soon as $L_1$ drops below probe 23, solenoid valve 53 would reopen to put the generator back in operation. However, such an automatic reset would not prevent the above-mentioned vascillation of $L_1$.

In operation, the operator first closes switch 47 and then depresses reset button 65 in order to supply power to electrode screens 15, 16. Pump control probe 22 and its associated circuitry will automatically serve to keep liquid level $L_2$ above the tip of probe 22. In the event there is an excessive withdrawal of hydrogen from the vessel, liquid level $L_1$, will rise to contact high level probe 23 which will cause the hydrogen removal line 28 to be closed until $L_1$ drops. In the event that liquid level $L_2$ drops below lower level probe 21, the entire unit will be shut down and can be restarted only when the liquid has been replenished.

In broader application, the present invention may be used in any system where a conductive liquid must be maintained in a vessel within a specified level range. A combination of two selected probes can provide a control system suitable for certain applications. For example, in a vessel having a conductive liquid which must be replenished, probe 22 may be used in conjunction with a liquid supply pump to maintain a nearly constant liquid level, and probe 21 can be used in conjunction with the unit's power supply to shut down the operation when the liquid level falls below a predetermined point due to pump failure or other cause.

In summary, the control system of the present invention is particularly useful to control the liquid level in a hydrogen generator pressure vessel wherein the liquid level varies with the hydrogen demand and may fluctuate widely due to a ruptured line or fitting. The system eliminates the need for constant supervision of the generator and allows for restart of the generator immediately by a reset button after correcting the cause of the shutdown.

What is claimed is:

1. In a pressurized vessel containing a volume of conductive liquid and having partition means therein defining a pair of spaces each having its own liquid level, said partition means serving to isolate an upper pressurized gas filled area within each of said spaces and said partition means being adapted to allow liquid flow from one space to another without allowing intermixing of the gases within said upper pressurized areas whereby the respective liquid levels in said spaces are interdependent and vary according to the relative pressures maintained in said upper pressurized areas, a system for controlling the respective levels of said liquid within each of said pair of spaces, comprising in combination:
   a. a first constant level electrode probe extending downwardly into said vessel and terminating at a point defining the desired constant liquid level to be maintained within the space into which said first probe extends, said first probe being electrically connected through associated circuitry to means for introducing liquid into said vessel when said liquid drops below said first probe; and
   b. a second high level electrode probe extending downwardly into said vessel and terminating at a point defining the upper limit for the liquid level within the space into which said second probe extends, said second probe being electrically connected through associated circuitry to means for lowering the liquid level within the space into which said second probe extends when such level rises to contact said second probe.

2. A vessel as claimed in claim 1 including a third low level shutdown electrode probe extending downwardly into said vessel and terminating at a point defining the lower limit for the liquid level within the space into which said third probe extends, said third probe being electically connected through associated circuitry to means for shutting down electrical power to at least a portion of said vessel when said liquid drops below said third probe.

3. A vessel as claimed in claim 1 wherein said means for introducing liquid comprises a liquid pump.

4. A vessel as claimed in claim 1 wherein said means for introducing liquid comprises a liquid inlet valve.

5. A vessel as claimed in claim 1 wherein said means for lowering the liquid level comprises a liquid outlet valve.

6. A vessel as claimed in claim 1 wherein said means for lowering the liquid level comprises means for increasing the pressure in the upper pressurized area of the space into which said second probe extends.

7. In a hydrogen and oxygen generator of the type having a pressure vessel containing an aqueous electrolytic solution and a pair of hydrogen and oxygen electrodes within said pressure vessel for the generation of hydrogen and oxygen by electrolysis and said pressure vessel having hydrogen and oxygen collection spaces proximate said electrodes and isolated from each other and means for extracting hydrogen and oxygen gases from said spaces at controlled rates, said spaces defining separate liquid levels within said vessel with said levels being interdependent and determined by the respective pressures within said spaces, a liquid level control system comprising, in combination:
   a. electric circuit means;
   b. a first constant liquid level sensor probe extending downwardly into a first selected one of said spaces and terminating at a point defining the desired constant liquid level to be maintained within said first selected space, said first probe being connected through said circuit means to means for raising the liquid level within said first selected space whenever such level drops below said first probe;
   c. a second high liquid level sensor probe extending downwardly into said hydrogen collection space and terminating at a point defining the upper limit for the liquid level within said hydrogen collection space, said second probe being connected through said circuit means to closure means for stopping the withdrawal of hydrogen from said hydrogen collection space whenever said liquid level within said hydrogen collection space rises to contact said second probe.

8. A generator as claimed in claim 7 including a third low level shutdown sensor probe extending downwardly into a second selected one of said spaces and terminating at a point defining the lower limit for the liquid level within said second selected space, said third probe being connected through said circuit means to means for shutting down electrical power to said electrodes when said liquid level within said second selected space drops below said third probe.

9. In a hydrogen and oxygen generator of the type having a pressure vessel containing an aqueous electrolytic solution and a pair of hydrogen and oxygen electrodes within said pressure vessel for the generation of hydrogen and oxygen by electrolysis and said pressure vessel having hydrogen and oxygen collection spaces isolated from each other with means for extracting hydrogen and oxygen from said spaces at controlled rates, said controlled rates of extracting being operative to control the pressure within said spaces and thereby dictate the level of electrolytic solution in said spaces, and said generator having a generator power supply for supplying power to said electrodes, a pump motor for supplying water to said pressure vessel and a solenoid valve for selectively opening and closing the line for taking hydrogen out of said generator, a liquid level control system comprising, in combination:

a. electrical power source, amplification and switching circuit means;

b. a first high liquid level sensor probe extending downward into said hydrogen collection space for a short distance and being connected through said circuit means to said solenoid valve for opening said valve during normal operation when the liquid level in said hydrogen collection space is below said first probe and for closing said solenoid valve when said liquid level rises to be in contact with said first probe after periods of excessive withdrawal of hydrogen from said pressure vessel;

c. a second low liquid level sensor probe extending downward into said oxygen collection space and below said first probe and being connected through said circuit means to said generator power supply for energizing said generator power supply when the liquid level in said oxygen collection space is above the tip of said second probe and for cutting off power to said generator power supply when said liquid level drops below said second probe; and d. a third pump control sensor probe extending downward into said oxygen collection space and being connected through said circuit means to said pump motor for supplying power to said motor whenever the liquid level in said oxygen collection space is below the tip of said third probe.

* * * * *